(12) United States Patent
Simske et al.

(10) Patent No.: US 8,751,816 B2
(45) Date of Patent: Jun. 10, 2014

(54) METHOD AND SYSTEM FOR PROVIDING RECORDING DEVICE PRIVILEGES THROUGH BIOMETRIC ASSESSMENT

(75) Inventors: Steven J. Simske, Fort Collins, CO (US); Daniel R. Blakley, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 176 days.

(21) Appl. No.: 13/125,782

(22) PCT Filed: Oct. 22, 2008

(86) PCT No.: PCT/US2008/080713
§ 371 (c)(1),
(2), (4) Date: Apr. 22, 2011

(87) PCT Pub. No.: WO2010/047695
PCT Pub. Date: Apr. 29, 2010

(65) Prior Publication Data
US 2011/0209214 A1  Aug. 25, 2011

(51) Int. Cl.
*G06F 21/20* (2006.01)
(52) U.S. Cl.
USPC ............... 713/186; 705/2; 705/3; 600/301; 726/21
(58) Field of Classification Search
None
See application file for complete search history.

(56) References Cited

U.S. PATENT DOCUMENTS

| 5,027,824 | A |  | 7/1991  | Dougherty |  |
|---|---|---|---|---|---|
| 5,701,894 | A |  | 12/1997 | Cherry |  |
| 5,719,950 | A | * | 2/1998  | Osten et al. | 382/115 |
| 6,715,078 | B1 | * | 3/2004  | Chasko et al. | 713/193 |
| 6,978,182 | B2 | * | 12/2005 | Mazar et al. | 607/60 |
| 7,044,911 | B2 |  | 5/2006  | Drinan |  |
| 2003/0028774 | A1 | * | 2/2003 | Meka | 713/176 |
| 2005/0177050 | A1 |  | 8/2005 | Cohen |  |
| 2007/0094509 | A1 |  | 4/2007 | Wei et al. |  |
| 2007/0143839 | A1 |  | 6/2007 | Chen |  |
| 2008/0120717 | A1 | * | 5/2008 | Shakkarwar | 726/18 |
| 2009/0024415 | A1 | * | 1/2009 | Alpert et al. | 705/3 |

FOREIGN PATENT DOCUMENTS

| CN | 1988443 A | 12/2005 |
|---|---|---|
| CN | 198443 A | 6/2007 |
| CN | 1988443 A | 6/2007 |
| JP | 2006163586 A | 6/2006 |
| KR | 1020010081533 A | 8/2001 |

OTHER PUBLICATIONS

International Search report and the written opinion; PCT/US/2008/080713; Mailing date: Jul. 22, 2009; citing 4 refs.

* cited by examiner

*Primary Examiner* — Jung Kim
*Assistant Examiner* — Janusz Kusyk

(57) ABSTRACT

A method and system for providing recording device privileges through biometric assessment are disclosed herein. An embodiment of the method includes monitoring information associated with a recording device. The information includes a recording device location, dynamic biometric data, knowledge data, and recording device identification data. From the monitored information, an identity of a then-current user of the recording device is determined. An authorization level for the then-current user is determined, and recording device access privileges are dynamically adjusted based on the determined authorization level.

15 Claims, 1 Drawing Sheet

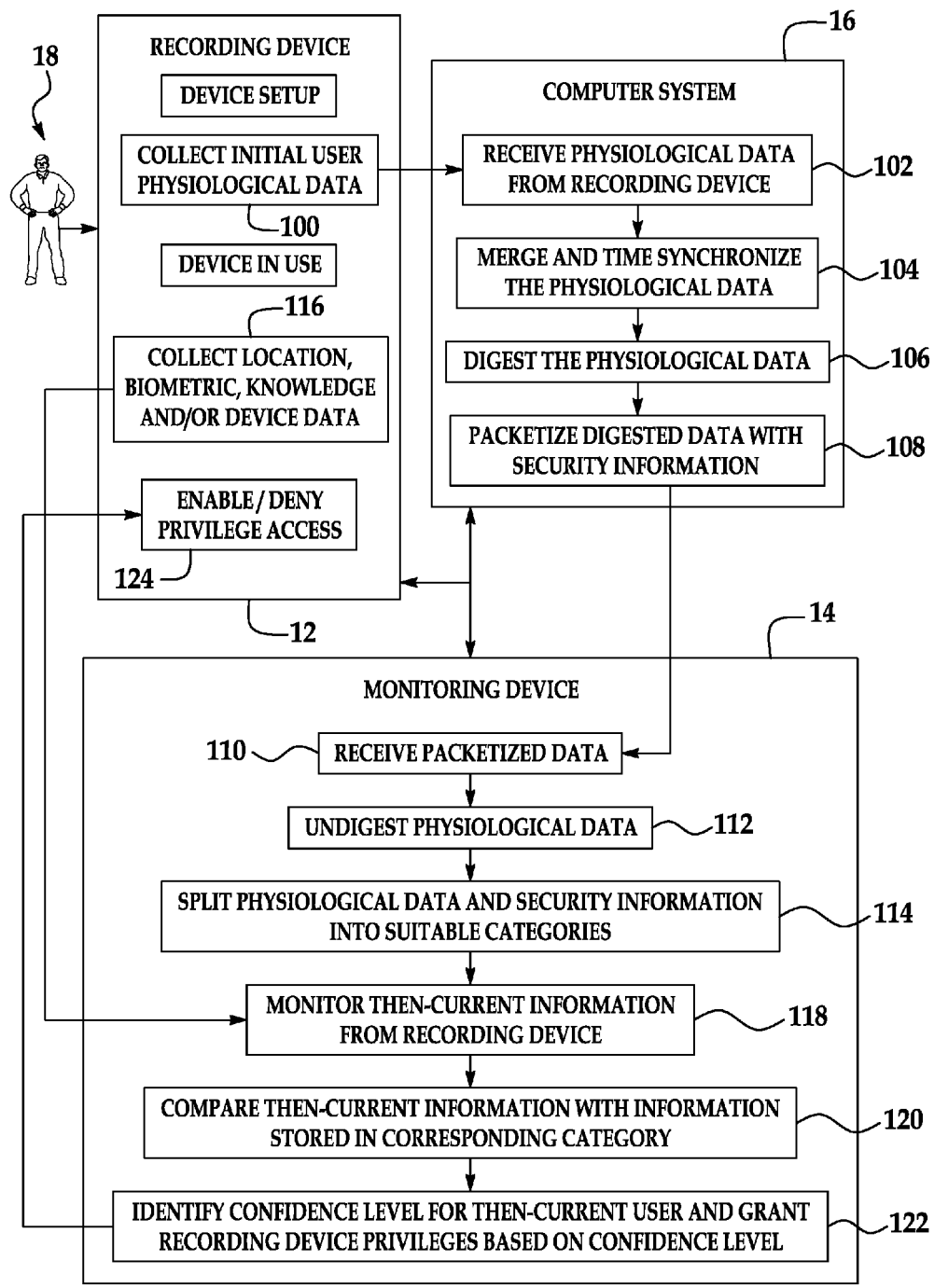

METHOD AND SYSTEM FOR PROVIDING RECORDING DEVICE PRIVILEGES THROUGH BIOMETRIC ASSESSMENT

BACKGROUND

The present disclosure relates generally to a method and system for providing recording device privileges through biometric assessment.

Access to secure information may be provided when a user demonstrates proof of knowledge. Often, proof of knowledge is demonstrated by personal identification numbers, passwords, static biometric data, or other like unique identifiers. Some knowledge data may be readily stolen, thereby leaving secure information susceptible to theft.

BRIEF DESCRIPTION OF THE DRAWING

Features and advantages of embodiments of the present disclosure will become apparent by reference to the following detailed description and drawing, in which like reference numerals correspond to the same or similar, though perhaps not identical, components.

FIG. 1 is a schematic diagram depicting an embodiment of a method for providing recording device privileges and an embodiment of a system for performing the method.

DETAILED DESCRIPTION

Embodiments of the method and system disclosed herein advantageously analyze possession, knowledge, identity, and location data in order to determine security access privileges for a particular device user. Dynamic biometric information is coupled to other information associated with the recording device, thereby providing a method and system which is capable of granting access privileges to a user based upon a level of confidence obtained in real-time from the device and its communication link. This method and system disclosed herein enable substantially simultaneous monitoring and security authorization determinations to take place. In turn, device access privileges are able to be dynamically adjusted.

Referring now to FIG. 1, an embodiment of the system 10 and the method performed via the system 10 are depicted. The system 10 includes a recording device or sensor 12 operatively connected to both a monitoring device 14 and a computer system 16. It is to be understood that the recording device 12, monitoring device 14 and computer system 16 are all operatively connected such that data may be transmitted from one device/system to another other device/system via a data communication link. In some instances, the monitoring device 14 is a component of the recording device 12, and in other instances the monitoring device 14 is a backend device that is in wireless communication with the recording device 12. The computer system 16 may be a backend device that is in wireless communication with an integrated recording and monitoring device 12, 14, or the computer system 16 and monitoring system 14 may both be backend devices that are in wireless communication with the recording device 12. While some examples have been given herein, it is to be understood that all configurations of the recording device 12, monitoring device 14, and computer system 16 are possible. The monitoring device 14 and computer system 16 may be local on the device 12, remote from the device 12, or any combination therebetween (e.g., one 14, 16 is local, the other 16, 14 is remote, etc.).

As depicted in FIG. 1, the recording device/sensor 12 collects physiological data from an initial user (see reference numeral 100). It is to be understood that the initial user generally refers to the person to whom the recording device 12 is being or has been issued and for whom information is being collected to set the device 12. The initial user may not be the first user, as the device 12 may have been tested by another user or previously issued to another user.

The physiological data collected will depend, at least in part, on the type of recording device 12 being used. The recording device/sensor 12 is selected from an electrocardiogram (ECG) monitor, electromyogram (EMG) monitor, electroencephalography (EEG) monitor, a heart rate monitor, a heart sound monitor, a blood pressure monitor, an aortic ejection velocity monitor (i.e., monitors "speed" of blood from the left ventricle into the aorta, which can be measured with, for example, echocardiography and the time velocity integral (TVI)), or a device capable of monitoring two or more of the previously listed physiological biometrics. The device 12 also includes sensors and leads (not shown) that record and transmit signals indicative of the biometrics to the device 12.

The physiological data is transmitted from the recording device 12 to the computer system 16 associated therewith, as shown at reference numeral 102. The computer system 16 is an individual computer or is part of an enterprise computing system which includes programs or software configured to receive data, perform fusion synchronization, digest information, and packetize the digested information with security information associated with the packetized information. As used herein, the term "enterprise computing system" means a network of interconnected computers, including virtualized and/or redundant processors, banks of processors and/or servers, etc. It is to be understood that the components of the computer system 16 may be implemented in a consolidated location, or portion(s) of the system may be implemented at different locations.

The hardware of such a system 16 includes an electronic processing device, such as, for example, a controller, a micro controller, a microprocessor, a host processor, and/or an application specific integrated circuit (ASIC). It is to be understood that the electronic processing device may be a processor working in conjunction with a central processing unit (CPU) performing the function of a general-purpose processor.

Computer program(s), firmware and/or software (e.g., computer readable code) may be loaded onto the computer or enterprise computing system, and stored in a memory thereof. Such programs and/or software are executable via the processing device. Examples of such programs(s) and/or software include those configured to merge, synchronize, digest and/or packetize data, and those configured to perform or provide any other desirable service/function.

The system 16 may also include one or more algorithms that are executable via the electronic processing device. Such algorithms are incorporated into the computer or enterprise computing system 16 and/or into the software. Generally, information is interpreted and manipulated by one or more of the algorithms.

As alluded to hereinabove, after receiving the physiological data, the computer system 16 performs a sensor fusion process, during which the data is merged and time synchronized (reference numeral 104).

The merged and synchronized data is then digested, as shown at reference numeral 106. The computer system 17 samples, filters, transforms as necessary, and encodes the physiological raw data (e.g., as a cepstral representation) for storage/transmission. This process may include initial extraction of critical data as well as compression of data. It is to be understood that either lossless or lossy compression may be had, depending upon whether the user is qualified, and whether there is a need or desire for physiological recording.

In the non-limiting example in which ECG data is recorded, the encoding of the ECGs for one or more leads may be accomplished via any of the following numbered examples.

1. Number of normal cardiac cycles (ECGs) and number of abnormal cardiac cycles (ECGs). Some ECG analysis is performed, but only the analysis data "normal" or "abnormal" is stored, where "normal" and "abnormal" can be defined to match any expected pathologies, such as aFib.

2. Number 1 (above) plus Histograms of the cardiac cycle intervals. For example, the "normal" ECGs may be represented as follows:

```
<Normal ECGs>
    <Criteria>PR/RT ratio 0.67-1.5</Criteria>
    <Criteria>Period 0.6-1.1 sec</Criteria>
    <Number>45,227</Number>
    <0.6-0.7 sec>284</0.6-0.7 sec>
    <0.7-0.8 sec>11,344</0.7-0.8 sec>
    <0.8-0.9 sec>27,889</0.8-0.9 sec>
    <0.9-1.0 sec>4,725</0.9-1.0 sec>
    <1.0-1.1 sec>985</1.0-1.1 sec>
</Normal ECGs>
```

In this example, some criteria for "normal" are also included. It is to be understood that each of these may be associated with different physical environments (e.g., standing, sitting, walking, lying down, etc.). The use of histogram mapping may be employed to allow for statistical variations in normal data from an acceptable user, while excluding unacceptable data from one who is not statistically likely to be the acceptable user. It is to be understood that as more data is acquired for the initial user, a more relevant statistical database is created, and thus the measure of security becomes more robust as statistical confidence increases.

3. Each cardiac cycle is represented as P(t), R(t), T(t). The times in the cardiac cycle at which the P, R and T wave peaks occur (typical values are 0.04, 0.16 and 0.34 sec) is recorded. Here a single cardiac cycle is represented as:

```
<Cardiac Cycle>
    <ID>EF3D</ID> <!—This may be omitted in a continuous
    sequence-->
    <Length>0.88</Length>
    <P>0.04</P>
    <R>0.17</R>
    <T>0.35</T>
</Cardiac Cycle>
```

4. Each cardiac cycle is represented as in Number 3 (above) plus the P, QRS, T and U (if present) intervals.

```
<Cardiac Cycle>
    <ID>EF3D</ID> <!—This may be omitted in a continuous
    sequence-->
    <Length>0.88</Length>
    <P>
    <Start>0.00</Start>
    <Peak>0.04</Peak>
    <End>0.08</End>
    </P>
    <R>
```

-continued

```
    <Start>0.14</Start>
    <Peak>0.17</Peak>
    <End>0.19</End>
    </R>
    <T>
    <Start>0.29</Start>
    <Peak>0.35</Peak>
    <End>0.38</End>
    </T>
</Cardiac Cycle>
```

5. Any other compressed version, up to completely lossless compression, of the ECG signals at full sampling frequency.

It is to be understood that the selection of the approach used for representing/encoding the physiological data is generally a trade-off between signal compression and maintaining a representation of the physiological signal that is robust enough to identify the initial user. More particularly, the trade-off exists between monitoring (which benefits from greater compression) and identification (which benefits from signal fidelity).

While not shown in FIG. 1, the computer system 16 may perform tamper detection monitoring after the data is digested. Such monitoring is generally performed in accordance with existing security standards. It is to be understood that the recording and storage of physiological data and the granting of the privileges may be qualified by tamper detection and revention circuits. These can conform to NSA type1 and FIPS 140-2, level 3 and level 4 security specifications, which are capable of detecting unallowed tampering either by exceeding the temperature limit range, electrical tampering, or other means. Tamper detection monitoring may also be performed for other tampering techniques, such as, for example, side channel attacks or TEMPEST. Still further, tamper detection monitoring may include digital signing of the data by the system 16, checkbits added by the system 16, system-level encryption, or the like. When any form of tampering is detected, access to secure data will be denied (e.g., the confidence level that a subsequent user is an authorized user is zero).

Referring back to FIG. 1, as shown in reference numeral 108, the computer system 16 then packetizes the digested data with any other security information (relating to the initial user or device 12) that is available. Other security information includes initial location data, initial knowledge data, and/or initial recording device identification data. The computer system 16 generally receives such data from the recording device 12 or from an entity issuing the recording device 12 to the initial user. The entity issuing the device 12 may be a doctor or other caregiver who is privy to such security information and has permission to share such information or has a direct relationship with the device manufacturer/provider.

The recording device 12 may include a location detection system for determining the location/position of the device 12 (and thus the location of a then-current user of the device 12, if such user is physically with the device 12). The location detection system may include a Global Position System (GPS) receiver, a radio triangulation system, a dead reckoning position system, and/or combinations thereof. As a non-limiting example, the GPS receiver provides accurate time and latitude and longitude coordinates of the device 12 in response to a GPS broadcast signal received from a GPS satellite constellation (not shown). If the user remotely accesses the recording device 12, his/her position may be retrieved via the IP address used for achieving such remote access. It is to be understood that location and other information may also be available from the IP address (network routing and addressing).

Still further, the recording device 12 may include a memory which stores machine identification data (e.g., a MAC identifier) and user-entered knowledge data (e.g., a user identifier, a password, other personal user information (name, birthday, etc.) thereon.

The packetized data (digested physiological data and available security information) is then transmitted to the monitoring device 14, as shown at reference numeral 110. It is to be understood that the monitoring device 14 is an electronic device that stores the initial information thereon, receives additional information when the device 12 is in use, and makes a determination as to the confidence level that the then-current user is the initial or some other authorized user. The monitoring device 14 includes hardware, firmware, and/or software for at least storing information, comparing information and determining an authorization level for the then-current user of the device 12.

The monitoring device 14 is used to decode, decrypt, descramble, or otherwise undigest the packetized physiological data, as shown at reference numeral 112. The undigested data, in addition to the initial security data transmitted therewith, may be split into location, biometric, knowledge or machine ID categories, as shown at reference numeral 116. Such categories enable the monitoring device 14 to easily retrieve the initial data for comparison with subsequently received data.

The location category will include any data that ties the initial user to a specific place. It is to be understood that this type of location data is different from data that ties the individual to the device 12. Location data may include GPS directly or through triangulation (e.g., as received from the recording device 12), an IP address (e.g., when a user remotely accesses the recording device 12), etc.

The biometric category will include any of the previously described physiological data in addition to any other biological metrics that are unique to individuals. Furthermore, this category may include other biometric information initially received from the recording device 12. For example, the recording device 12 may include additional biometric scanning technologies, including, but not limited to finger-scan, voice-scan, face-scan, iris-scan, retina-scan, hand-scan, signature-scan, physiological-"gait" scan, DNA sampling, keystroke-scan, and/or pressure sensors (e.g., for detecting pressure while a user is handling the device, speaking, touch-padding or typing via a device keyboard or touchscreen, etc.). When the recording device 12 is issued to the user, he/she may utilize one or more of the listed scans to input such data.

Biometrics including the physiological response to bodily queries, such as standing up or sitting down, offer difficult-to-reproduce initial biometrics (that may be sent to the monitoring device 14 for storage in the initial user's profile). As a non-limiting example, during configuring of the recording device 12, an initial user may be asked to stand up or sit down. As he/she responds, his/her VCG is uniquely, dynamically recorded and is ultimately transmitted to the monitoring device 14 for storage. As another non-limiting example, an individual's unique gait data may be acquired optically or via a highly sensitive device, such as a displacement sensor (e.g., an inertial sensor device), where the X, Y, Z timed increments are recorded and ultimately transmitted to the monitoring device 14 for storage.

It is to be understood that for a biometrically-approved subject (e.g., the initial user), the biometric data received, processed and stored may be cumulative. As more data is acquired, more statistical relevance is possible. Therefore, both the reliability of positive identification as well as the reliability of negative identification tends to improve with use.

The knowledge category will include any data that can be provided by a user directly (e.g., a password) or indirectly (e.g., a challenge-based identity). It is to be understood that the direct user-input knowledge (a login ID, password, personal information, etc.) will be stored in the knowledge category for comparison with information submitted by a subsequent user. Indirect or challenge-based knowledge may contain event timing patterns and/or specific historical user physiological data to compare to challenge responses-as-knowledge.

The recording device identification category will include any data that uniquely identifies a machine (including identification through the software, firmware, log files, hard drive hashes, etc. of the machine). As a non-limiting example, the machine ID data may include the MAC/EHA address.

After the device/sensor 12 is configured for a particular user (or program interface, etc.), and his/her profile is stored in the monitoring device 14 (see, for example, steps 100-114 of FIG. 1), the method further includes collecting then-current information via the recording device 12 (as shown at reference numeral 116), and monitoring the then-current information (as shown at reference numeral 118). In one embodiment, monitoring will be initiated in response to the monitoring device 14 recognizing that use of the recording device 12 has been initiated (i.e., the device 12 is in an "ON" position). When turned "ON", the recording device 12 may transmit a signal indicative of the same to the monitoring device 14.

It is to be understood that some of the then-current information is collected by the recording device 12, and other of the then-current information is collected in response to a query to the then-current user (discussed further hereinbelow).

In particular, the monitoring device 14 monitors the recording device 12 for then-current location information and then-current biometric information. The term "then-current" when referring to information means that the information is newly received by the recording device 12, in particular, the information is received as monitoring is being performed. It is to be understood that the definition of "newly received" is dependent on the particular biometric. As such, the "then-current" definition requires a set of data extending backward in time from the present, t, to t-DELTA, where DELTA is the length in time of data needed to identify an individual using the given biometric. For voice, this DELTA may be a few seconds of active speaking; for keyboard entry, it may be a few tens of seconds.

The received location and biometric information may be compared with the location and biometric information stored in the monitoring device 14 in an attempt to identify the then-current user of the device 12, as shown at reference numeral 120. After the data comparison is made, the monitoring device 14 can identify a confidence level and an authorization level (having device privileges associated therewith) for the then-current user, as shown at reference numeral 122. In response to this determination, the recording device 12 will grant access privileges associated with the authorization level or deny access privileges because the identified levels are not associated with some or any privileges (reference numeral 124). Non-limiting examples of such privileges include access to data, records or other secure information stored in the monitoring device 14, authorization to utilize the recording device 12 or other services it offers, or the like.

The confidence level is representative of how sure the monitoring device 14 is that the then-current user is the initial user or another authorized user. This confidence level is based upon the comparison of the then-current data and the stored data. If, for example, the then-current information corresponds with that stored in the monitoring device 14, the device 14 can identify a high confidence level (e.g., 99-100%) for the then-current user and grant the user device privileges, such as, for example, access to secure information. If, however, the then-current information does not correspond with that stored in the monitoring device 14, the device 14 can identify a low confidence level (e.g., less than 90%) for the then-current user and grant or deny the user device privileges based on the determined confidence level. In some instances, if the confidence level is too low (e.g., less than 80%), the recording device 12 may be powered "OFF", thereby denying even use of the device 12.

As a non-limiting example, if the then-current location data indicates that the user is at the initial user's home address, and the ECG pattern received corresponds with the ECG pattern saved in the monitoring device 14, the monitoring device 14 can issue a relatively high confidence level, identify an authorization level associated with such a confidence level, and grant the then-current user any privileges associated with the authorization level. When the confidence level is high and access privileges are granted, the then-current information that is received may be transmitted to the computer system 16 for processing and ultimately transmitted to the monitoring device 14 for storage in the user's profile. As such, data for the initial user may be accumulated even after the initial set up of the device 12.

It is to be understood that the machine ID of the recording device 12 being used may also be compared with the machine ID stored in the monitoring device 14. A match may further increase the confidence level of the then-current user, whereas a non-match may further decrease the confidence level that the then-current user is authorized. As a non-limiting example, a SIMM (single in-line memory module) may be moved from one device 12 to another device 12, which may slightly decrease the confidence level that the then-current user is the authorized user. However, privileges may be granted to this user if the confidence level (taking into consideration the other comparison results) is indicative of the fact that the user is an authorized user. Such allowances are based, at least in part, on the determined confidence level and the associated policy for the device 12.

Since the confidence level is reevaluated each time additional then-current data is received, it is to be understood that the access privileges may be dynamically adjusted.

It is to be further understood that levels of confidence and authorization levels are generally determined and associated with particular access privileges or no access privileges before the recording device 12 is issued to a user. Such levels may be statistically based. The monitoring device 14 is generally programmed with such information and is capable of enabling or disabling privileges of the recording device 12 when a determination is made as to the then-current user's authorization level. This depends, at least in part, on the workflow and policy. As a non-limiting example, the system 10 may be a biometric VPN, where if/when the statistical assurance is less than a given threshold, the VPN drops.

While not shown in FIG. 1, if the confidence and authorization levels determined based on the location and biometric data are not sufficient to identify the then-current user as an authorized user, a new patient-identification eliciting workflow (PIEW) may be transmitted from the monitoring device 14 (or another device of the system 10 allowing access to privileges) to re-establish then-current user identity.

In one embodiment, the PIEW queries the then-current user for knowledge data. As a non-limiting example of this type of query, the then-current user may be asked to recite or input the authorized user's ID, password, etc. If the entered information is accurate, the then-current user is authorized, and corresponding privileges may be granted.

In another embodiment, the PIEW queries the then-current user for a bodily challenge. As a non-limiting example, the then-current user may be asked to stand up or sit down, and as the then-current user responds, his/her ECG data is recorded and transformed, in real-time, to VCG data. The dynamically recorded VCG data is compared with the initial user's VCG data on file, and if the data matches, the confidence level that the then-current user is authorized may be higher. Other similar bodily challenges (e.g., using a touchpad, speaking, typing a sentence, etc.) may be utilized to dynamically identify the then-current user.

Coupling dynamic biometric information to the recording device 12 provides proof of possession, user identity and location. Thus, monitoring for patient care is advantageously coupled with proof of identity, which is determined using information beyond user knowledge information. In addition to providing multiple levels of security, the method and system 10 disclosed herein also dynamically provide authorization and associated access to privileges, such as information feedback, patient record, etc.

Beyond security, the method and system 10 provide a means of acquiring non-invasive remote care health monitoring of the individual along with the security of the individual's information. This may be particularly suitable for biometric monitoring where the nature of the biometric monitoring includes vital signs. Among the vital signs that are potentially applicable for biometric monitoring and where remote health care may be acquired is cardiac arrhythmia monitoring. As a non-limiting example, cardiac data may be acquired and tabulated, and key parameters extracted. This advantageously enables remote health care data-mining through examining recently-acquired data for arrhythmias, et al., for early health warnings.

Clause 1. A method for providing recording device privileges through biometric assessment, the method comprising:

monitoring information associated with a recording device, the information including a location, dynamic biometric data, knowledge data, and recording device identification data;

from the monitored information, determining an identity of a then-current user of the recording device;

determining an authorization level for the then-current user; and dynamically adjusting recording device access privileges based on the determined authorization level.

Clause 2. The method as defined in clause 1 wherein prior to monitoring, the method further comprises:

collecting physiological data from an initial user via the recording device;

merging and time synchronizing the physiological data;

digesting the collected physiological data;

packetizing the digested physiological data with security information, the security information being selected from an initial location of a user of the recording device, an initial recording device identification, initial user knowledge data, and combinations thereof;

transmitting the packetized data to a monitoring device operatively connected to the recording device;

undigesting the physiological data; and splitting the undigested physiological data and security information into one of the following categories: location data, biometric data, knowledge data, or recording device identification data.

Clause 3. The method as defined in any of the preceding clauses wherein determining the authorization level for the then-current user includes:

comparing at least the location and the dynamic biometric data with the undigested physiological data and security information; and determining, from the comparison, a level of confidence that the then-current user is an authorized user of the recording device.

Clause 4. The method as defined in clause 3 wherein the level of confidence is associated with one or more predetermined recording device access privileges, and wherein dynamically adjusting the recording device access privileges is based on the determined level of confidence.

Clause 5. The method as defined in any of the preceding clauses wherein when the monitoring is insufficient to determine the then-current user identity, the method further comprises transmitting a new patient-identification eliciting workflow from a monitoring device operatively connected to the recording device, the new patient-identification eliciting workflow including at least one of a query for knowledge data from the then-current user or a query for a physiological challenge from the then-current user, and wherein a then-current user response to the respective query is utilized to determine the then-current user identity.

Clause 6. A method for providing recording device privileges through biometric assessment, the method comprising:

receiving, at a monitoring device, packetized digested physiological data and security information, the security information being selected from a location of a user of a recording device, a recording device identification, recording device user knowledge, and combinations thereof;

undigesting the physiological data;

splitting the undigested physiological data and security information into one of the following categories: location data, biometric data, knowledge data, or recording device identification data;

recognizing, via the monitoring device, that the recording device is in use;

monitoring at least a then-current location and then-current biometric data to determine an identity of a then-current user of the recording device;

determining an authorization level for the then-current user based at least on a received recording device identification, the then-current location data and the then-current user identity; and dynamically adjusting recording device access privileges based on the determined authorization level.

Clause 7. The method as defined in clause 6 wherein when the monitoring is insufficient to determine the then-current user identity, the method further comprises transmitting a new patient-identification eliciting workflow from the monitoring device, the new patient-identification eliciting workflow including at least one of a query for knowledge data from the then-current user or a query for a physiological challenge from the then-current user, and wherein a then-current user response to the respective query is utilized to determine the then-current user identity.

Clause 8. The method as defined in any of clauses 6 and/or 7 wherein prior to receiving the packetized digested physiological data and security information, the method further comprises:

collecting physiological data from an initial user via the recording device;

merging and time synchronizing the physiological data;

digesting the collected physiological data; and packetizing the digested physiological data with the security information.

Clause 9. The method as defined in any of clauses 6 through 8 wherein digesting the collected physiological data includes at least one of filtering the data, transforming the data, encoding the data, encrypting the data, scrambling the data, extracting critical data from the collected physiological data, compressing the data, or combinations thereof.

Clause 10. The method as defined in any of clauses 6 through 9, further comprising performing tamper detection monitoring of the recording device prior to packetizing the physiological data with the security information.

Clause 11. The method as defined in any of clauses 6 through 10 wherein the physiological data is selected from electrocardiogram data, vectorcardiogram data, heart rate data, heart sound data, blood pressure data, aortic ejection velocity, or combinations thereof.

Clause 12. The method as defined in any of clauses 6 through 11 wherein determining the authorization level for the then-current user includes:

comparing the then-current location data, the then-current recording device identification, and the then-current user identity with the undigested physiological data and security information; and determining, from the comparison, a level of confidence that the then-current user is an authorized user of the recording device, wherein the level of confidence is associated with one or more predetermined recording device access privileges.

Clause 13. A system for providing recording device privileges through biometric assessment, the system comprising:

a recording device, including:

means for receiving location data;

means for receiving dynamic biometric data;

means for receiving knowledge data;

means for extracting recording device identification data; and a monitoring device operatively connected to the recording device, the monitoring device configured to:

monitor information the recording device location, the dynamic biometric data, the knowledge data, and the recording device identification data;

determine, from the monitored information, an identity of a then-current user of the recording device;

determine an authorization level for the then-current user; and dynamically adjust recording device access privileges based on the determined authorization level.

Clause 14. The system as defined in clause 13, further comprising:

a computer system operatively connected to the recording device, the computer system configured to:

receive physiological data of an initial user from the recording device;

merge and time synchronize the physiological data;

digest the physiological data;

packetize the digested physiological data with security information, the security information being selected from an initial location of a user of the recording device, an initial recording device identification, initial user knowledge data, and combinations thereof; and transmit the packetized data to the monitoring device.

Clause 15. The system as defined in clauses 13 and/or 14 wherein the monitoring device is further configured to:
- undigest the physiological data; and
- split the undigested physiological data and security information into one of the following categories: location data, biometric data, knowledge data, or recording device identification data;
- compare the recording device location, the dynamic biometric data, the knowledge data, and the recording device identification data with the undigested physiological data and security information; and
- determine, from the comparison, a level of confidence that the then-current user is an authorized user of the recording device.

While several embodiments have been described in detail, it will be apparent to those skilled in the art that the disclosed embodiments may be modified. Therefore, the foregoing description is to be considered exemplary rather than limiting.

What is claimed is:

1. A method for providing recording device privileges through biometric assessment, the method comprising:
   monitoring information associated with a recording device, the monitoring being accomplished with a monitoring device operatively connected with the recording device, the information including a location, dynamic biometric data including physiological data that is monitored over time of a then-current user of the recording device, knowledge data, and recording device identification data;
   comparing, by the monitoring device, at least the monitored location information and the monitored physiological data with stored security information and stored physiological data for an initial user of the recording device;
   determining, by the monitoring device and from the comparison, a confidence level for the then-current user, the confidence level being a statistically based percentage representing how sure the monitoring device is that the then-current user is the initial user or another authorized user of the recording device;
   determining, by the monitoring device, an authorization level from a plurality of authorization levels for the then-current user based upon the determined confidence level; and
   dynamically adjusting, by the monitoring device, access to one or more recording device access privileges based on the determined authorization level and the determined confidence level;
   wherein at least one authorization level from the plurality of authorization levels grants access to a first recording device access privilege and denies access to a second recording device access privilege.

2. The method as defined in claim 1 wherein prior to monitoring, the method further comprises:
   collecting physiological data that is monitored over time from the initial user via the recording device;
   by a computer system operatively connected to the recording device, merging and time synchronizing the collected physiological data; by the computer system, digesting the collected physiological data;
   by the computer system, packetizing the digested, collected physiological data with security information, the security information being selected from an initial location of the initial user of the recording device, an initial recording device identification, initial user knowledge data, and combinations thereof;
   transmitting the packetized data to the monitoring device operatively connected to the recording device;
   by the monitoring device, undigesting the collected physiological data;
   by the monitoring device, splitting the undigested, collected physiological data and security information into one of the following categories: location data, biometric data, knowledge data, or recording device identification data; and storing the collected physiological data and the security information.

3. The method as defined in claim 1 wherein when the confidence level is insufficient to determine that the then-current user is the initial user or another authorized user, the method further comprises transmitting a new patient-identification eliciting workflow from the monitoring device, the new patient-identification eliciting workflow including at least one of a query for knowledge data from the then-current user or a query for a physiological challenge from the then-current user, and wherein a then-current user response to the respective query is utilized to determine the then-current user identity.

4. A method for providing recording device privileges through biometric assessment, the method comprising:
   receiving, at a monitoring device, packetized digested physiological data and security information, the security information being selected from a location of a user of a recording device, a recording device identification, recording device user knowledge, and combinations thereof, and the physiological data being physiological data that is monitored over time;
   undigesting the physiological data;
   splitting the undigested physiological data and security information into one of the following categories: location data, biometric data, knowledge data, or recording device identification data;
   recognizing, via the monitoring device, that the recording device is in use;
   monitoring at least a then-current location and then-current biometric data to determine an identity of a then-current user of the recording device, the then-current biometric data being physiological data that is monitored over time;
   comparing the then-current location data, the then-current recording device identification, and the then-current user identity with the undigested physiological data and security information;
   from the comparison, determining a statistically based confidence value representative of how sure the monitoring device is that the then-current user is an initial user or another authorized user of the recording device;
   determining an authorization level from a plurality of authorization levels for the then-current user based at least on a received recording device identification, the then-current location data and the determined confidence value; and
   dynamically adjusting access to one or more recording device access privileges based on the determined authorization level;
   wherein at least one authorization level from the plurality of authorization levels grants access to a first recording device access privilege and denies access to a second recording device access privilege.

5. The method as defined in claim 4 wherein when the confidence value is insufficient to determine that the then-current user is the initial user or another authorized user, the method further comprises transmitting a new patient-identification eliciting workflow from the monitoring device, the new patient-identification eliciting workflow including at least one of a query for knowledge data from the then-current user or a query for a physiological challenge from the then-current user, and wherein a then-current user response to the respective query is utilized to determine the then-current user identity.

6. The method as defined in claim 4 wherein prior to receiving the packetized digested physiological data and security information, the method further comprises:
collecting physiological data from the initial user via the recording device;
merging and time synchronizing the collected physiological data;
digesting the collected physiological data; and
packetizing the digested, collected physiological data with the security information.

7. The method as defined in claim 6 wherein digesting the collected physiological data includes at least one of filtering the data, transforming the data, encoding the data, encrypting the data, scrambling the data, extracting critical data from the collected physiological data, compressing the data, or combinations thereof.

8. The method as defined in claim 6, further comprising performing tamper detection monitoring of the recording device prior to packetizing the physiological data with the security information.

9. The method as defined in claim 6 wherein the physiological data is selected from electrocardiogram data, vectorcardiogram data, heart rate data, heart sound data, blood pressure data, aortic ejection velocity, or combinations thereof.

10. A system for providing recording device privileges through biometric assessment, the system comprising:
a recording device, including:
means for receiving location data;
means for receiving dynamic biometric data including physiological data that is monitored over time;
means for receiving knowledge data; and
means for extracting recording device identification data; and
a monitoring device operatively connected to the recording device, the monitoring device configured to:
monitor information including the recording device location, the dynamic biometric data including the physiological data, the knowledge data, and the recording device identification data;
compare at least the monitored location information and the monitored physiological data with stored security information and stored physiological data for an initial user of the recording device;
determine, from the comparison, a confidence level for the then-current user, the confidence level being a statistically based percentage representing how sure the monitoring device is that the then-current user is the initial user or another authorized user of the recording device;
determine an authorization level from a plurality of authorization levels for the then-current user based on the confidence level; and
dynamically adjust access to one or more recording device access privileges based on the determined authorization level and the confidence level;
wherein at least one authorization level from the plurality of authorization levels grants access to a first recording device access privilege and denies access to a second recording device access privilege.

11. The system as defined in claim 10, further comprising:
a computer system operatively connected to the recording device, the computer system configured to:
receive physiological data of the initial user from the recording device;
merge and time synchronize the physiological data;
digest the physiological data;
packetize the digested physiological data with security information, the security information being selected from an initial location of the initial user of the recording device, an initial recording device identification, initial user knowledge data, and combinations thereof; and
transmit the packetized data to the monitoring device.

12. The method as defined in claim 1 wherein the monitored and stored physiological data are selected from electrocardiogram data, vectorcardiogram data, heart rate data, heart sound data, blood pressure data, aortic ejection velocity, or combinations thereof.

13. The method as defined in claim 1 wherein the dynamically adjusting includes:
granting access to the first recording device access privilege; and
denying access to the second recording device access privilege.

14. The method as defined in claim 1 wherein the granting or denying, by the monitoring device, further comprises:
granting access to secure information and to use of the recording device when the confidence level ranges from 99% to 100%;
denying at least one of the recording device access privileges when the confidence level ranges from about 80% to about 90%; or
powering down the recording device when the confidence level is less than 80%.

15. The method as defined in claim 1 wherein the access to the secure information is through a virtual private network (VPN), and when the confidence level is below a given threshold, the method further comprises dropping the virtual private network.

* * * * *